United States Patent [19]

Pisecker et al.

[11] 3,798,522

[45] Mar. 19, 1974

[54] ARRANGEMENT FOR EXCITING AN ASYNCHRONOUS START SYNCHRONOUS MOTOR

[75] Inventors: Hans Pisecker, Tullin, Austria; Werner Schicht, Birr, Switzerland

[73] Assignee: Brown Boveri & Company Limited, Baden, Austria

[22] Filed: June 5, 1973

[21] Appl. No.: 367,149

[30] Foreign Application Priority Data
June 26, 1972 Switzerland.......................... 9568/72

[52] U.S. Cl.................. 318/174, 318/176, 318/181, 318/183, 318/193
[51] Int. Cl. ............................................ H02p 1/46
[58] Field of Search ........... 318/167, 174, 176, 181, 318/183, 193

[56] References Cited
UNITED STATES PATENTS

| | | | |
|---|---|---|---|
| 3,354,368 | 11/1967 | Williamson | 318/176 |
| 3,509,439 | 4/1970 | Schicht | 318/183 |
| 3,667,014 | 5/1972 | Merhof et al. | 318/167 |

*Primary Examiner*—Gene Z. Rubinson
*Attorney, Agent, or Firm*—Pierce, Scheffler & Parker

[57] ABSTRACT

An arrangement for exciting the rotating field winding of a synchronous motor includes an alternating current exciter whose armature is mounted on the motor shaft and delivers direct current to the field winding by means of a main rectifier bridge circuit also mounted on the motor shaft. The negative half of the rectifier bridge consists of controllable semiconductor elements and the positive half of non-controllable type semiconductor elements. The controllable semiconductor elements in the bridge perform in a normal manner during synchronous operation of the motor but means in the form of an auxiliary rectifier arrangement are provided to render them non-conductive during asynchronous starting thus to cut off current flow from the output of the main rectifier bridge to the field winding of the motor.

6 Claims, 6 Drawing Figures

ARRANGEMENT FOR EXCITING AN ASYNCHRONOUS START SYNCHRONOUS MOTOR

This invention relates to an improvement in a basically conventional arrangement for exciting an asynchronous-start synchronous motor, wherein the rotating winding of an alternating current exciter armature mounted on the shaft of the synchronous motor is connected, without sliprings, by way of a co-rotating rectifier bridge connection to the rotating field winding provided in the synchronous motor and having at least one parallel resistor, and wherein controlled converter valves are provided for the temporary separation of the rectifier bridge connection from the field winding during asynchronous operation, the rectifier valves provided in one half of the bridge connection being uncontrolled and those of the other half of the bridge being controlled and a control device, which consists of another diode auxiliary rectifier arrangement together with a loading resistor, being connected to the armature winding of the exciter.

An arrangement substantially possessing these features is known from Swiss Pat. No. 464,340. The arrangement described there is illustrated in FIG. 1. The rotating winding of the armature 3 provided in an alternating current exciter and mounted on the shaft of the synchronous motor is connected, without sliprings, by way of the likewise corotating rectifier bridge connection 5, 6 to the rotating field winding 2 contained in the synchronous motor and provided with the parallel resistor 4 (all parts lying within the broken lines are rotatable together with the rotor). 6 designates the converter valves which are provided for the temporary separation of the rectifier bridge connection from the field winding 2 during asynchronous operation; these controlled valves are disposed in one half of the bridge connection 5, 6, while the uncontrolled rectifier valves 5 lie in the other half of the bridge. For the control of the converter valves 6 there is provided a control device which is connected to the exciter armature winding 3 and which consists of another diode auxiliary rectifier arrangement 8 in a bridge connection, together with a loading resistor 9.

In the known arrangement it is a disadvantage that the control auxiliary rectifier arrangement is connected to the exciter armature winding 3 by way of a relatively expensive isolating transformer (preferably in a V-connection). It appears desirable to dispense with this transformer. In addition, with a high remanent voltage of the exciter, undesirable premature excitation may occur. Finally, because of the indefinite switching-on of the excitation an optimal synchronizing moment is usually not obtained.

The invention seeks to obviate these disadvantages. Where the elimination of the isolating transformer is concerned this is achieved by locating the controlled converter valves of the rectifier bridge connection in the negative half of the bridge, connecting each phase of the exciter armature winding direct in each case to the cathode of respective controlled converter valves of the rectifier bridge, and in each case to the anode of respective diodes of the half of the auxiliary rectifier arrangement which is not connected direct to the control electrode of the converter valves, conjointly connecting the cathodes of these diodes to one terminal of the auxiliary resistor, and connecting the second terminal of this resistor to the interconnection point of the anodes of the diodes belonging to the other half of the auxiliary rectifier arrangement, the cathodes of these diodes being connected in each case to the control electrodes of the appertaining conversion valves.

Undesired premature excitation is avoided and the optimisation of the synchronization moment is achieved according to the invention by further measures, which are described in detail below.

The invention is now explained more fully with reference to FIGS. 2 to 5, in which:

FIG. 2 shows an example of embodiment of the invention with a rectifier bridge and a separate diode auxiliary rectifier, FIG. 3a shows a simplified variant of the embodiment according to FIG. 2, in which the uncontrolled rectifiers of the positive half of the rectifier bridge also take over the function of the diodes of the half of the auxiliary rectifier arrangement which is not connected direct to the control electrode of the converter valves;

Figure 1:
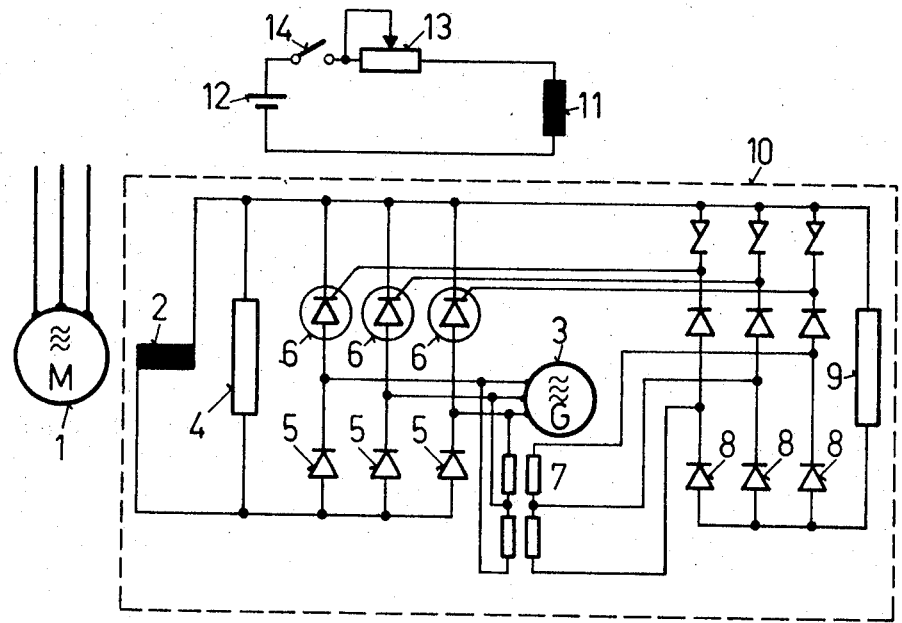

As compared with the known arrangement shown in FIG. 1, the circuit arrangements according to FIGS. 2, 3a, 4, and 5 show, as the most noticeable difference, the absence of the isolating transformer. In the known arrangement, it is, however, not possible simply to omit the transformer 7 and connect the phases of the exciter armature winding 3 direct to the interconnection points of the series diodes in the corresponding bridge branches of the auxiliary rectifiers 8; if this were done, the anodes of the controlled converter valve 6 would be galvanically connected to the anodes of those auxiliary diodes 8 whose cathodes are connected to the control electrodes of the corresponding converter valves. On the contrary, it has been found that the correct potential conditions for the connection of the auxiliary rectifier arrangement without a transformer can be achieved only if the controlled converter valves, that is to say the thyristors 6, are placed in the negative half of the rectifier bridge 5, 6.

Figure 2:
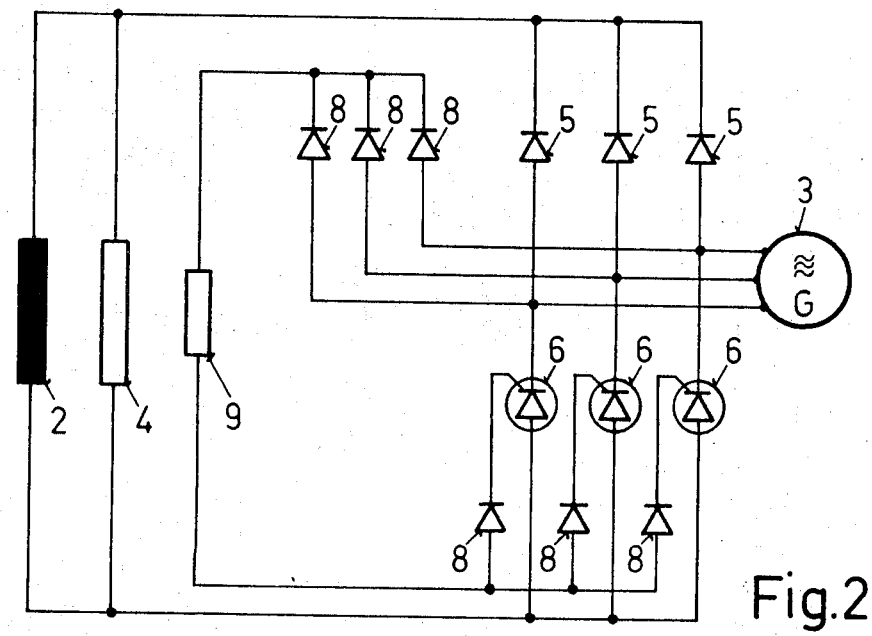

Apart from this, the construction and mode of operation of the circuit arrangement shown in FIG. 2 entirely corresponds to the known arrangement shown in FIG. 1; the control unit consists of the simple auxiliary rectifier arrangement 8 with the auxiliary resistor 9. Each thyristor 6 is provided with an auxiliary diode 8 which supplies the control current and which works on the same phase of the alternating voltage, so that the ignition signal appears at the desired moment.

Figure 3A:
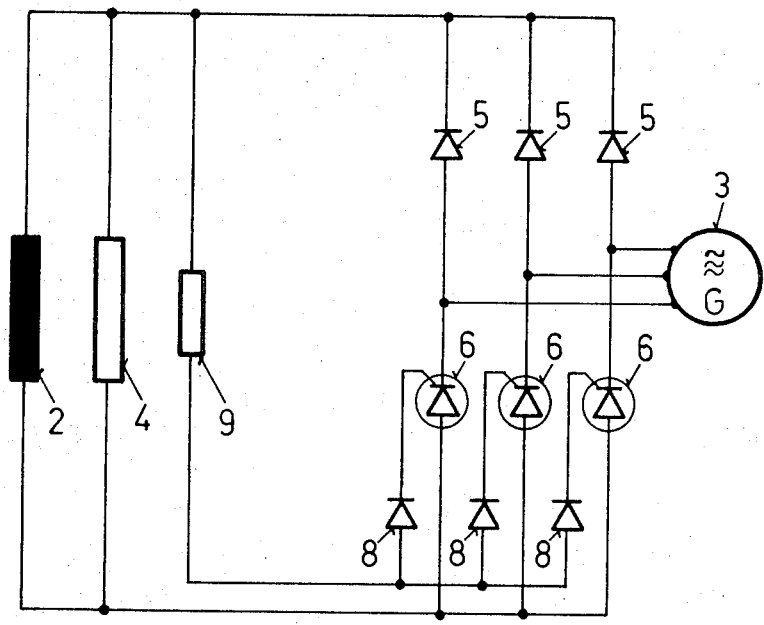
FIG. 3b shows auxiliary thyristors with ignition voltage threshold as an alternative solution instead of the auxiliary rectifier-diodes for supplying the control current to the controlled converter valves.

According to FIG. 3a the circuit can be still further simplified by connecting the interconnected anodes of the auxiliary diodes, which are connected on the cathode side to the control electrodes of the thyristors 6, through the auxiliary resistor 9 direct to the interconnected cathodes of the uncontrolled rectifiers 5 of the positive half of the rectifier bridge 5, 6; in addition to their normal function in the rectifier bridge, the diodes 5 then also take over the function of the auxiliary diodes 8 in the positive half of the auxiliary rectifier arrangement (control device) according to FIG. 2.

Figure 3B:
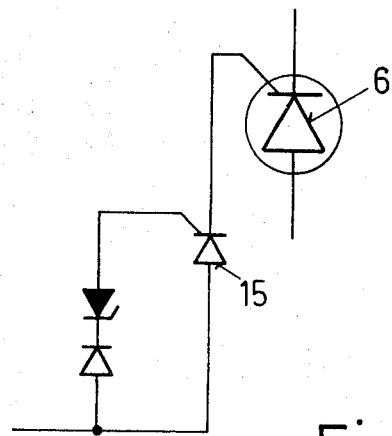
Figure 4:
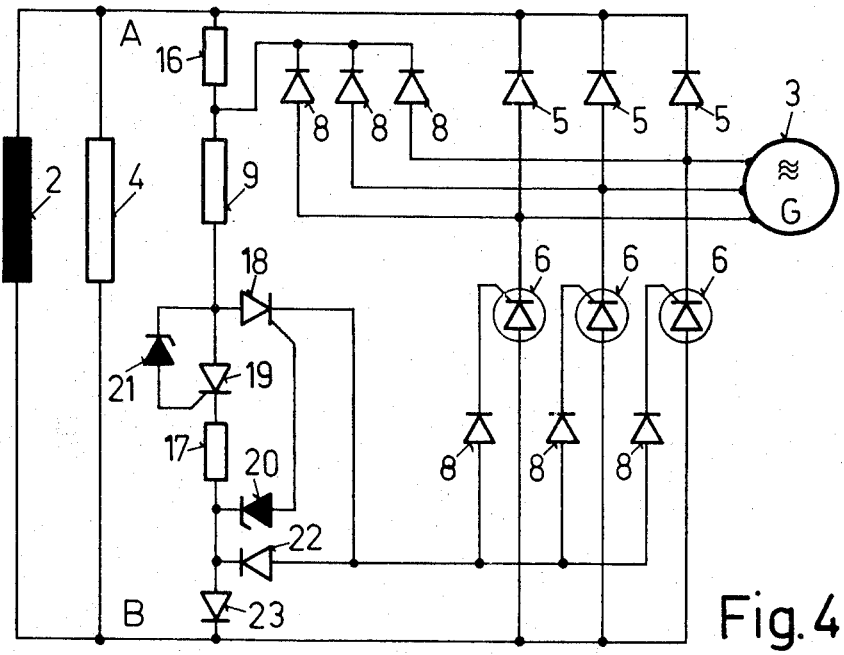
FIG. 4 is an arrangement like that of FIG. 2 but with additional circuitry to obtain an optimal synchronizing torque when the machine is running up to speed.

As already observed, when the auxiliary diodes 8 are used for supplying the control current to the thyristors 6, undesirable premature excitation may occur in the event of a high remanent voltage of the exciter. In order to avoid this, as illustrated in FIG. 3b, it is possible for auxiliary thyristors 15, which ignite-through only when a threshold voltage is exceeded, to be used instead of the auxiliary diodes 8 supplying the control current. This voltage threshold is achieved by the antiseries connection of a Zener diode and of a normal diode in the control circuit of the auxiliary thyristors. A remanent voltage can thus be screened off; after ignition of the auxiliary thyristors, however, the full voltage is available again in the control circuit. This measure can naturally be applied to the circuit arrangements shown in FIG. 2 and FIG. 3a.

The known circuit according to FIG. 1 and the circuits according to FIGS. 2 and 3a do not permit optimal pulling into step of a machine which slips under a high load torque, since the time when the excitation is switched on and the magnitude of the excitation at that time are not defined.

The synchronizing torque is maximal when the preexcited exciter is connected to the field winding as soon as the current, induced through slip, in the field winding begins to flow in the direction which it assumes during stable operation. In order to fulfill this condition the circuit arrangement shown in FIG. 4 was developed, this arrangement incorporating the following additions:

The interconnected cathodes of the uncontrolled rectifiers of the positive half of the rectifier bridge 5, 6 are connected via a resistor $R_{16}$ to the interconnected cathodes of the diodes 8 of the positive half of the auxiliary rectifier arrangement. Between the interconnected anodes of the diodes 8 of the negative half of the auxiliary rectifier and the terminal of the auxiliary resistor 9 which faces these diodes is connected a series-parallel-network containing the following elements:

a. a first forward-directed thyristor 18 in series between the auxiliary resistor 9 and diodes 8 of the negative half of the auxiliary rectifier,
b. a branch parallel to the anode-cathode section of this thyristor 18 and consisting of the series connection of a second thyristor 19, which is likewise forward-connected, a resistor 17, and a first diode 22 poled in the blocking direction,
c. a first Zener diode 20 lying between the point of connection of the resistor 17 to the first diode 22 and the control electrode of the first thyristor 18, and
d. a second Zener diode 21 between the anode and the control electrode of the second thyristor 19.

During operation, the Zener diode 20 adjusts the voltage $U_{20}$ by which the exciter is connected to the field winding of the slipping machine, for example the exciter voltage corresponding to low-load excitation of the main machine.

The excitation of the exciter during synchronization is so selected that the exciter voltage lies between $U_{20}$ and ($U_{20} + U_{21}$), $U_{21}$ being the Zener voltage of the Zener diode 21. If the pole A is at positive potential in relation to B, the auxiliary thyristor 19 receives control voltage via the resistors 16 and 9 and also via the Zener diode 21, and is thus ignited, whereupon the voltage of the exciter is applied to the Zener diode 20. Since, as previously stated, this voltage should be higher than $U_{20}$, the auxiliary thyristor 18 is also ignited (at the latest when the voltage drop at 9 has decreased through the decline of the voltage AB), and the auxiliary circuit is thus closed so that the main thyristors 6 receive control signals. As soon as the voltage AB becomes as low as the voltage of the exciter, the current in the field winding reverses its direction and the exciter commences to feed current to the field winding at the correct moment of time.

In order to protect the control system against positive voltages from the side B (asynchronous operation), the diode 23 is necessary.

The diode 22 and the resistor 17 ensure that once the auxiliary thyristor 18 has ignited it remains conductive.

As a subsidiary function, the circuit arrangement also prevents premature ignition of the main thyristors 6 in the event of excessively high remanent voltage of the exciter; the same effect is therefore achieved as with the auxiliary thyristors 15 in FIG. 3b.

If heavy losses in the auxiliary resistor 9 during asynchronous starting, during which a high field voltage is induced, are accepted, the resistor 16 and also the auxiliary diodes 8 in the positive half of the auxiliary rectifier arrangement can be dispensed with.

Through the increase of the number of phases of the exciter, a higher exciter current can be controlled with a given size of thyristor and diode, while ideal distribution of current to the rectifiers is imposed.

Figure 5:
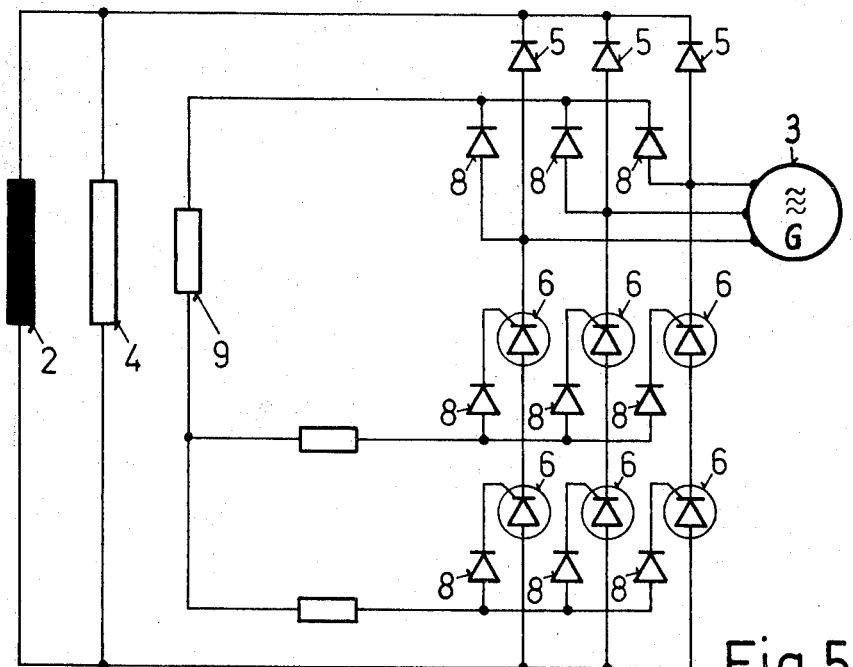
FIG. 5 shows the use of a thyristor-series connection in the negative half of the rectifier bridge connection in the event of excessively high switching-in voltage in the field winding.

If the connecting-in voltage in the field winding exceeds the value permissible for the thyristors, it is possible (if the protective resistor 4 is not made small and disconnectable) to use a series connection of thyristors in the negative bridge half with a control device according to FIG. 5 (the potential dividing resistors also necessary here are not shown in the figure).

The proposed circuit arrangements are distinguished by simplicity. With their aid, synchronous motors of practically all sizes can be made without sliprings.

We claim:
1. In an arrangement for exciting an asynchronous-start synchronous motor, wherein the rotating winding of an alternating current exciter armature mounted on the shaft of the synchronous motor is connected, without sliprings, by way of a co-rotating rectifier bridge connection to the rotating field winding provided in the synchronous motor and having at least one parallel resistor, and wherein controlled converter valves are provided for the temporary separation of the rectifier bridge connection from the field winding during asynchronous operation, the rectifier valves provided in one half of the bridge connection being uncontrolled and those of the other half of the bridge being controlled and a control device, which consists of another diode auxiliary rectifier arrangement together with a loading resistor, being connected to the armature winding of the exciter, the improvement wherein the controlled converter valves of the rectifier bridge connection are located in the negative half of the multi-phase bridge, each phase of the exciter armature winding being connected respectively direct to the cathode of respective converter valves of the rectifier bridge and to the anode of respective diodes of the half of the auxiliary rectifier arrangement which is not connected to the control electrodes of the converter valves, the cathodes of said diodes being conjointly connected to one terminal of the auxiliary resistor and the second terminal of this resistor being connected to the interconnection point of the anodes of the diodes which belong to the other half of the auxiliary rectifier arrangement and the cathodes of which are respectively connected to the control electrodes of the appertaining controlled converter valves.

2. An arrangement according to claim 1, wherein the interconnected cathodes of the uncontrolled rectifier valves of the positive half of the rectifier bridge connection are connected both to the field winding and to the auxiliary resistor whereby in addition to their function in the rectifier bridge connection said uncontrolled rectifier valves also perform the function of the diodes which are disposed in the auxiliary rectifier arrangement and which are connected on the anode side to the individual phases of the exciter armature winding.

3. An arrangement according to claim 1 wherein the auxiliary rectifier valves supplying the control current to the controlled converter valves of the rectifier bridge arrangement are in the form of semiconductor thyratrons which ignite-through only when a threshold voltage is exceeded.

4. An arrangement according to claim 3, wherein the semiconductor thyratrons are in the form of Zener voltage controlled thyristors.

5. An arrangement according to claim 1, wherein the interconnected cathodes of the uncontrolled rectifiers of the positive half of the rectifier bridge are connected via a resistor to the interconnected cathodes of the diodes of the positive half of the auxiliary rectifier arrangement, and wherein between the interconnected anodes of the diodes of the negative half of the auxiliary rectifier and the terminal, facing these diodes, of the auxiliary resistor a series-parallel network is connected which contains the following elements:

a. a first forward-connected thyristor in series between the auxiliary resistor and the diodes of the negative half of the auxiliary rectifier;

b. a branch parallel to the anode-cathode section of said first thyristor and consisting of the series connection of a second, likewise forward-biased thyristor, a resistor, and a first diode biased in the blocking direction, c. a first Zener diode lying between the point of connection of said resistor to said first diode and the control electrode of said first thyristor;

d. a second Zener diode between the anode and the control electrode of said second thyristor; and that during synchronization the excitation of the exciter is so selected that the exciter voltage is higher than the Zener voltage of said first Zener diode and lower than the sum of the Zener voltages of said first Zener diode and said second Zener diode.

6. An arrangement according to claim 5, wherein between the point of connection of said resistor to said first diode and the negative pole of the rectifier bridge a second forward-biased diode is provided.

* * * * *

UNITED STATES PATENT OFFICE
CERTIFICATE OF CORRECTION

Patent No. 3,798,522     Dated March 19, 1974

Inventor(s) HANS PISECKER and WERNER SCHICHT

It is certified that error appears in the above-identified patent and that said Letters Patent are hereby corrected as shown below:

Claim 1, line 66, the word "direct" should appear before "to"

Signed and sealed this 30th day of July 1974.

(SEAL)
Attest:

McCOY M. GIBSON, JR.
Attesting Officer

C. MARSHALL DANN
Commissioner of Patents